United States Patent
Dorgelo et al.

(10) Patent No.: US 8,285,744 B2
(45) Date of Patent: Oct. 9, 2012

(54) INDEXING AND SEARCHING MANUFACTURING PROCESS RELATED INFORMATION

(75) Inventors: Eric G. Dorgelo, Port Moody (CA); Kevin G. Gordon, Annacis Island Delta (CA); Clifton H. Bromley, New Westminister (CA); Douglas J. Reichard, Fairview, OH (US); Marc D. Semkow, Burnaby (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1335 days.

(21) Appl. No.: 11/240,701

(22) Filed: Sep. 30, 2005

(65) Prior Publication Data
US 2007/0078824 A1    Apr. 5, 2007

(51) Int. Cl.
  *G06F 7/00* (2006.01)
  *G06F 17/30* (2006.01)
(52) U.S. Cl. .................. 707/770; 707/769; 707/776
(58) Field of Classification Search .............. None
See application file for complete search history.

(56) References Cited

U.S. PATENT DOCUMENTS

| | | | |
|---|---|---|---|
| 5,544,352 A | 8/1996 | Egger et al. | |
| 5,701,467 A | 12/1997 | Freeston | |
| 6,233,571 B1 | 5/2001 | Egger et al. | |
| 6,473,761 B1 * | 10/2002 | Shigemori et al. | 707/999.1 |
| 6,751,343 B1 | 6/2004 | Ferrel et al. | |
| 6,751,606 B1 * | 6/2004 | Fries et al. | 707/3 |
| 6,987,845 B1 | 1/2006 | Van Nutter et al. | |
| 2004/0117362 A1 | 6/2004 | Nunez | |
| 2004/0193596 A1 | 9/2004 | Defelice et al. | |
| 2005/0120013 A1 | 6/2005 | Chang et al. | |
| 2005/0251534 A1 | 11/2005 | Nunez | |

* cited by examiner

*Primary Examiner* — Fred I Ehichioya
*Assistant Examiner* — Garrett Smith
(74) *Attorney, Agent, or Firm* — Turocy & Watson, LLP; Alexander R. Kuszewski; John Miller (57) ABSTRACT

Indexing agents and/or data brokers are leveraged to provide search query results related to manufacturing processes. The indexing agents allow different manufacturing configuration data types to be "sub-indexed," allowing them to be easily searched. In one instance, the sub-indices can be aggregated together to create an overall index to facilitate in query searches of the configuration data. Separate indexing agents can be utilized for indexing contents of the configuration components for the human-machine interface (HMI) and control system and the like. Data brokers can be employed to facilitate in responding to query searches by indexing/searching real-time process variables (tags) and historical data in persistent storage. A search engine can then be employed to aggregate the search results and present them to a user in a selectable fashion. User selected results are then rendered in the proper format and displayed to the user.

29 Claims, 12 Drawing Sheets

INDEXING AND SEARCHING MANUFACTURING PROCESS RELATED INFORMATION

TECHNICAL FIELD

The subject matter herein relates generally to industrial automation and, more particularly, to systems and methods for providing indexing and searching of manufacturing process information.

BACKGROUND

During the early industrial revolution, machines were integrated into the work environment to speed up the manufacturing of goods. The utilization of machines allowed production numbers to increase well beyond what human labor alone would allow. This caused an exponential growth period for most companies as the drastically lower price of goods initiated by the lower cost of production increased sales dramatically. Soon, most manufacturers were racing to have their factories "modernized" as well. For some of the manufacturers, simple steam driven power sources utilizing leather belts enabled them to increase production and minimize human labor. However, a great deal of the manufacturing still required great dexterity and, thus, human labor remained invaluable for those types of processes.

Eventually, more complex manufacturing machines were created to perform intricate tasks but required complex control systems to operate. These were burdensome to maintain and control, but they gave their owners the ability to replace tedious human labor with more efficient machines. The complexity of the controls eventually drove the manufacturers to employ computers to facilitate in controlling and monitoring these complex systems. And, in order to maintain the complex control systems, human interfaces were developed to allow the human labor force to interact with the machines.

Human/machine interfaces (HMIs) or simply user interfaces are important to the successful operation and maintenance of industrial automation devices and equipment. User interfaces provide the essential communication link between operators and automation devices. This link allows operators to, among other things, setup devices, monitor device status during operation, as well as analyze device health. Without such user interfaces, high level industrial automation would be difficult if not impossible to achieve.

Despite the increased control that HMI devices afford, there still is little in the way of efficiently locating specific bits of data and/or data related to specific events. If an operator desires to review historical data, for example, around a specific event, they must retrieve data for a specified period and review the data in totality to determine if their specific data is included. This can be extremely time consuming and can lead to missed data that may be extremely relevant. The amount of manufacturing process information is also on the rise as more complex machines are utilized in the manufacturing processes. Thus, the amount of data to peruse by an operator or maintenance personnel constantly increases while the means to find and retrieve the data has done little to keep up with the staggering amounts of information.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to industrial automation and, more particularly, to systems and methods for providing indexing and searching of manufacturing process information. Indexing agents and/or data brokers are leveraged to provide search query results related to manufacturing processes. The indexing agents allow different manufacturing configuration data types to be "sub-indexed," allowing them to be easily searched. In one instance, the sub-indices can be aggregated together to create an overall index to facilitate in query searches of the configuration data. Separate indexing agents can be utilized for indexing contents of the configuration components for the human-machine interface (HMI) and control system such as, for example, HMI projects, controller code, recipe definitions, and/or report definitions and the like. Data brokers can be employed to facilitate in responding to query searches by indexing/searching real-time process variables (tags) and historical data in persistent storage. A search engine can then be employed to aggregate the search results and present them to a user in a selectable fashion. User selected results are then rendered in the proper format and displayed to the user. These techniques allow an unprecedented access to manufacturing process information and reduced search time greatly facilitating maintenance, troubleshooting, productivity, and management of the manufacturing process.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Furthermore, the subject matter may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject matter.

Systems and methods are provided that enable searching of manufacturing process information. In one instance, a system is comprised of a search engine, data brokers, indexing agents and a query language that enables users to search their production control system for configuration, real-time and/or historical information based on user specified search criteria by returning information that matches the criteria from the data brokers and indexing agents. Queries can return textual and/or graphical (e.g., HMI) components and the like.

Figure 1:
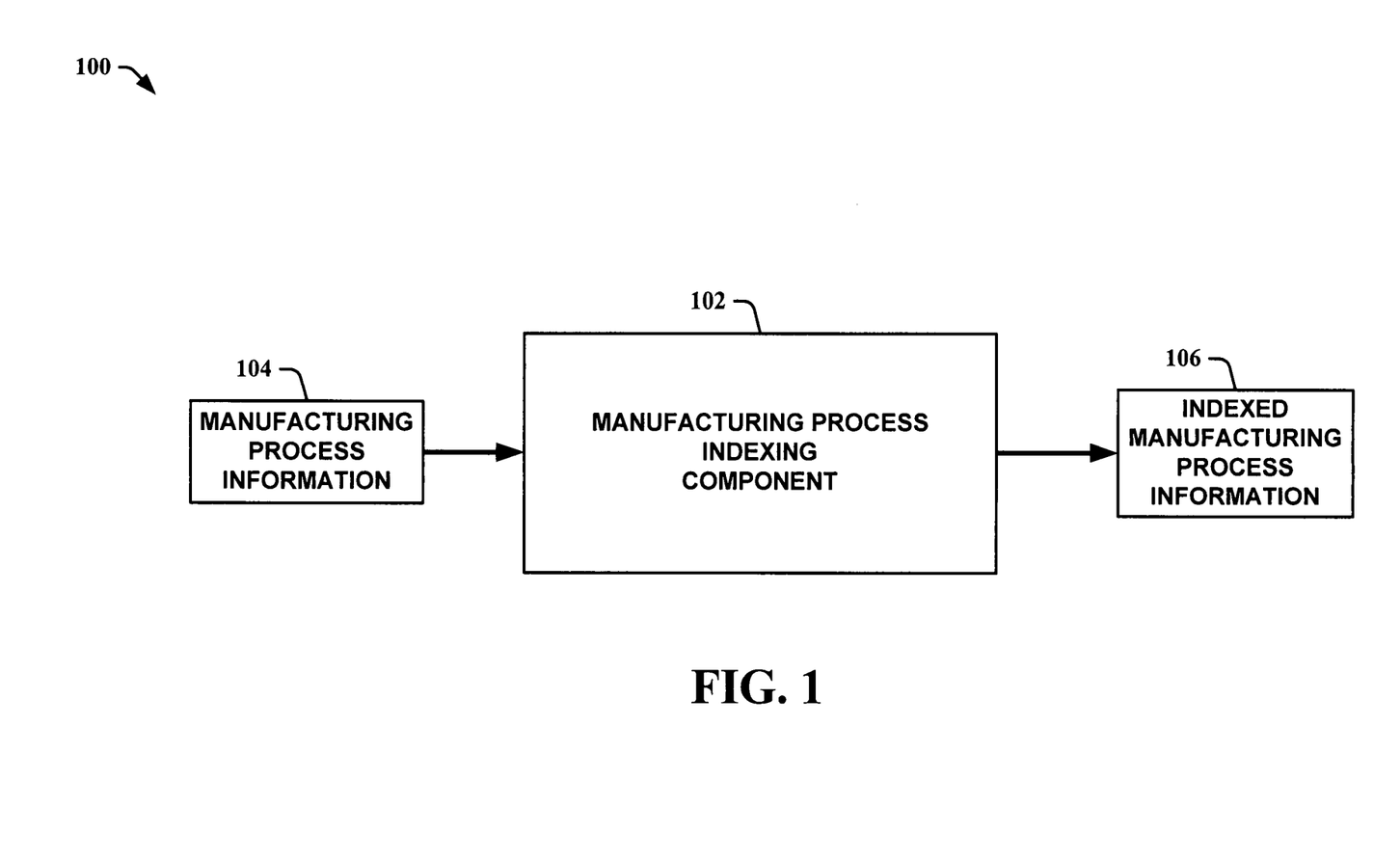
FIG. 1 is a block diagram of a manufacturing process indexing system in accordance with an aspect of an embodiment.

In FIG. 1, a block diagram of a manufacturing process indexing system 100 in accordance with an aspect of an embodiment is shown. The manufacturing process indexing system 100 is comprised of a manufacturing process indexing component 102 that obtains manufacturing process information 104 and provides indexed manufacturing process information 106. The manufacturing process information 104 can include, but is not limited to, real-time data and/or historical data relating to a manufacturing process. For example, real-time process variables (tags), historical data stored in persistent storage, and/or HMI system configuration component data (e.g., HMI project data, controller code, recipe definitions, and/or report definitions, etc.).

The manufacturing process indexing component 102 accesses and indexes the manufacturing process information 104 to provide the indexed manufacturing process information 106 to allow for efficient searching of the information 104 in a manufacturing process environment. The manufacturing process indexing component 102 accomplishes this by employing manufacturing information type specific indexing interfaces (i.e., "indexing agents") to allow disparate types of data to be indexed into "sub-indices." In some instances, the sub-indices can be aggregated into an "overall index." However, with an appropriate search engine, the sub-indices themselves can be employed to facilitate searching as well.

Figure 2:
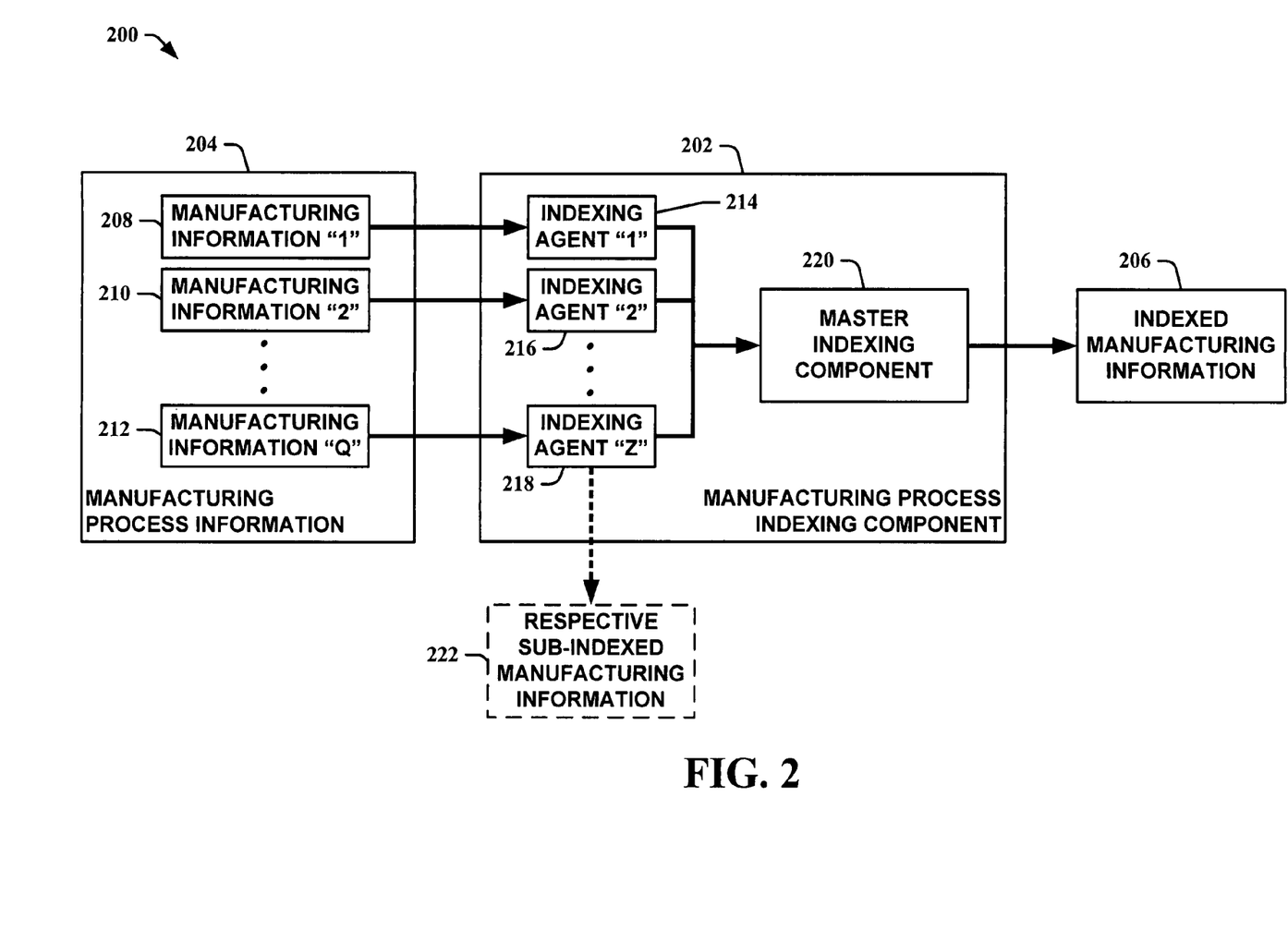
FIG. 2 is another block diagram of a manufacturing process indexing system in accordance with an aspect of an embodiment.

Looking at FIG. 2, another block diagram of a manufacturing process indexing system 200 in accordance with an aspect of an embodiment is depicted. The manufacturing process indexing system 200 is comprised of a manufacturing process indexing component 202 that obtains manufacturing process information 204 and provides indexed manufacturing information 206. The manufacturing process information 204 is comprised of manufacturing information "1-Q" 208-212, where "Q" is an integer from one to infinity. The manufacturing process indexing component 202 is comprised of indexing agents "1-Z" 214-218, where "Z" is an integer from one to infinity, and master indexing component 220.

The indexing agents "1-Z" 214-218 access their respective types of manufacturing information "1-Q" 208-212 and provide indexing and/or searching of the respective manufacturing information "1-Q" 208-212. The indexing agents "1-Z" 214-218 can provide a sub-index for their respective manufacturing information "1-Q" 208-212. Although illustrated in FIG. 2 as a 'one-for-one' mapping of indexing agent to manufacturing information, other instances of indexing agents "1-Z" 214-218 can include 'one-to-many' and 'many-to-one' if an indexing agent is capable of multiple and/or partial indexing of a specific type of manufacturing information. The indexing agents "1-Z" 214-218 allow for indexing and/or searching of disparate manufacturing information types such as manufacturing information "1-Q" 208-212. In one instance, the number of the indexing agents "1-Z" 214-218 is dynamically expandable and/or dynamically reducible as necessary to adapt to expanding and/or contracting types of manufacturing information.

In this example, the master indexing component 220 aggregates the sub-indices provided by the indexing agents "1-Z" 214-218 into an overall index represented by the indexed manufacturing information 206. Optionally, a respective sub-indexed manufacturing information 222 can be provided from the indexing agents "1-Z" 214-218. The optional respective sub-indexed manufacturing information 222 represents the separate sub-indexed disparate manufacturing information "1-Q" 208-212. An appropriate search engine can employ the overall index and/or the sub-indices to facilitate in query searches.

Figure 3:
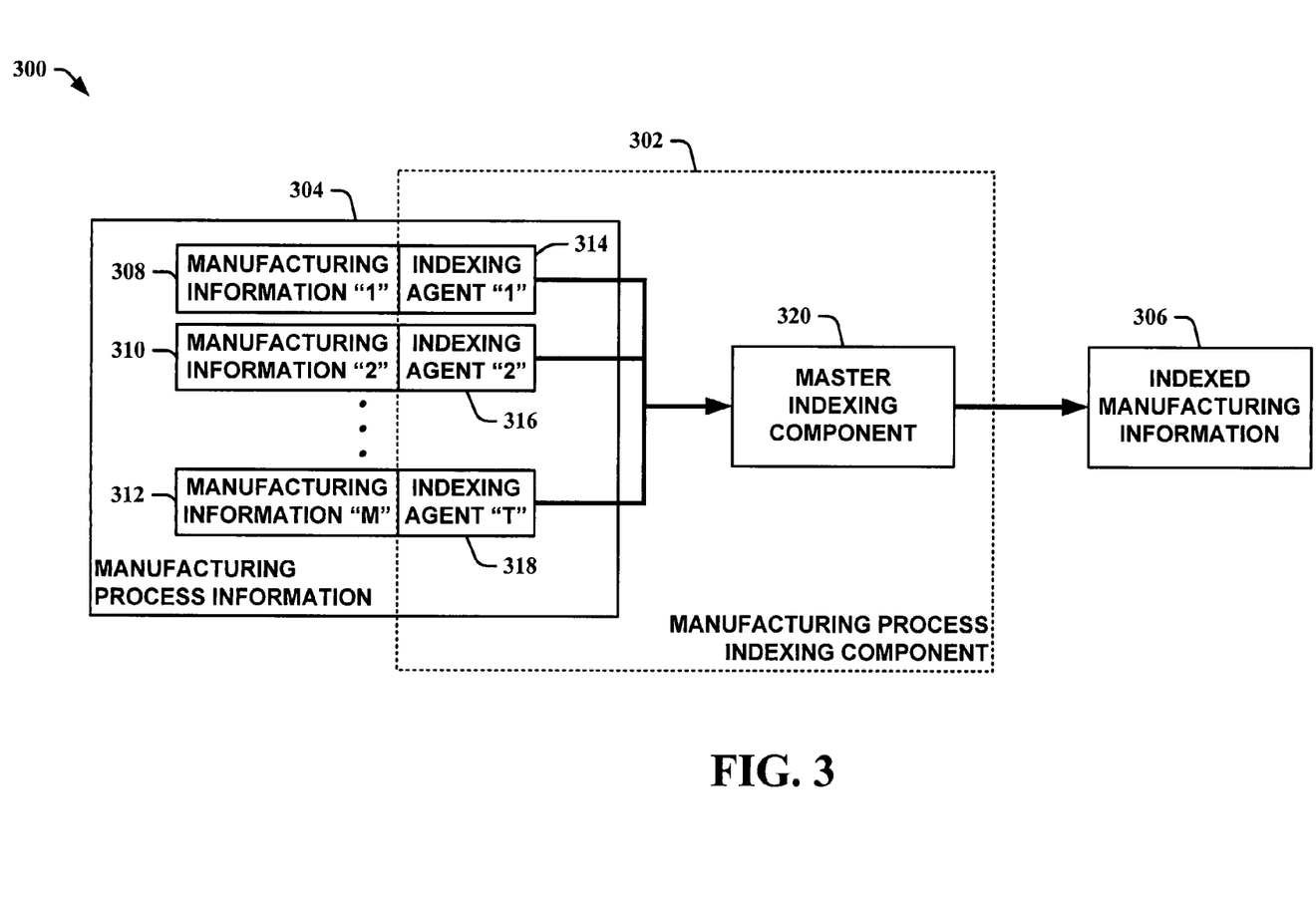
FIG. 3 is yet another block diagram of a manufacturing process indexing system in accordance with an aspect of an embodiment.

Turning to FIG. 3, yet another block diagram of a manufacturing process indexing system 300 in accordance with an aspect of an embodiment is illustrated. The manufacturing process indexing system 300 is comprised of a manufacturing process indexing component 302 that obtains manufacturing process information 304 and provides indexed manufacturing information 306. The manufacturing process information 304 is comprised of manufacturing information "1-M" 308-312, where "M" is an integer from one to infinity, and their respective indexing agents "1-T" 314-318, where "T" is an integer from one to infinity. The manufacturing process indexing component 302 (illustrated in FIG. 3 by the dashed line) is comprised of the indexing agents "1-T" 314-318 and the master indexing component 320.

In this example, the indexing agents "1-T" 314-318 are resident in close proximity to their respective data types (e.g., manufacturing information "1-M" 308-312). Thus, the manufacturing process indexing component 302 (dashed line) employs the remote indexing agents "1-T" 314-318 and the master indexing component 320 to provide an overall index represented by the indexed manufacturing information 306. In other instances, the indexing agents "1-T" 314-318 can be a mixture of local and remote agents as well. This allows for substantial flexibility in implementing the manufacturing process indexing component 302. For example, if access to the manufacturing information "1-M" 308-312 is limited in bandwidth, transmitting search results and/or sub-indices to the master indexing component 320 and/or directly to a search engine is substantially more efficient than accessing the manufacturing information "1-M" 308-312 from a remote location.

Figure 4:
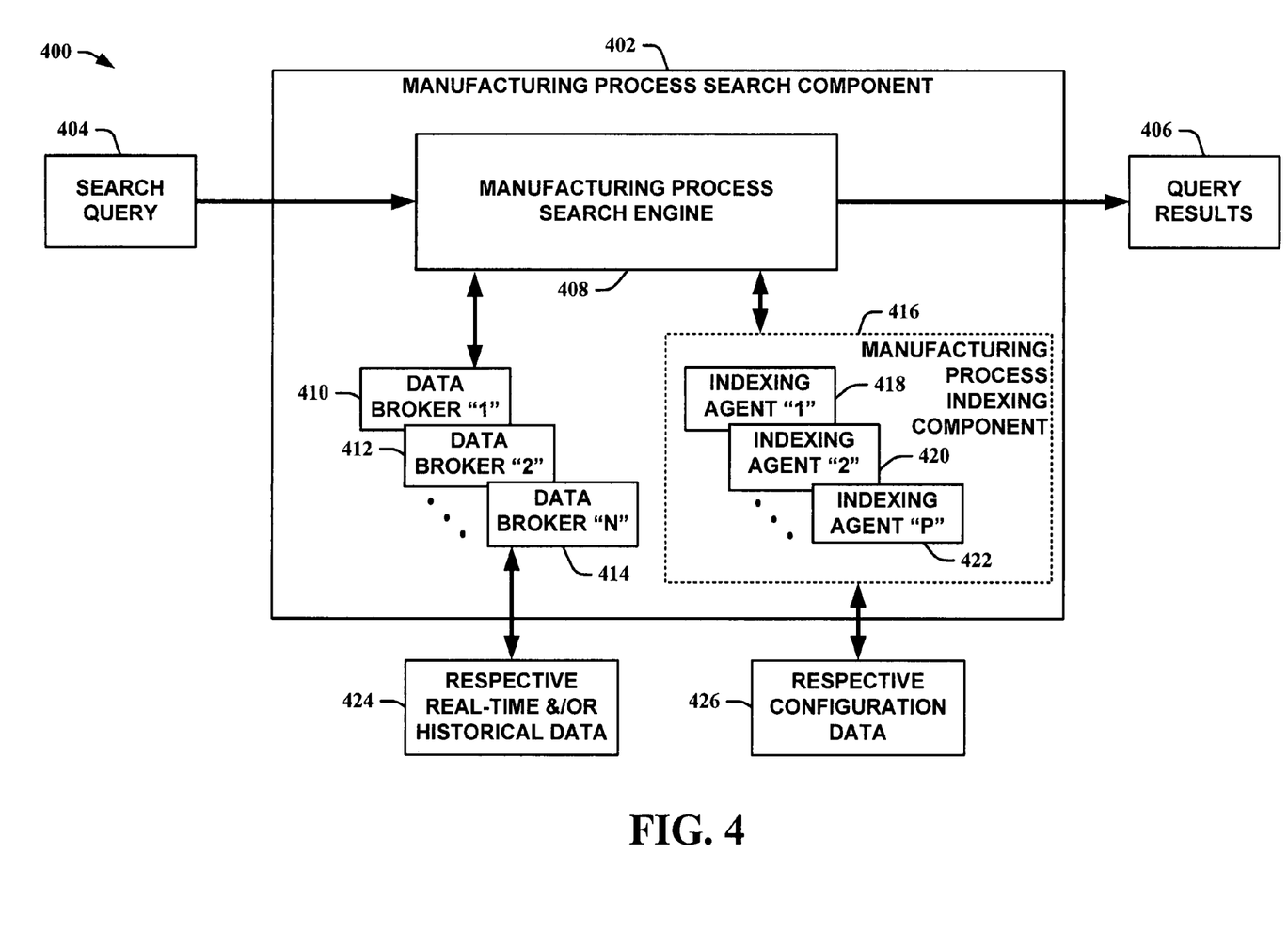
FIG. 4 is a block diagram of a manufacturing process search system in accordance with an aspect of an embodiment.

Moving on to FIG. 4, a block diagram of a manufacturing process search system 400 in accordance with an aspect of an embodiment is shown. The manufacturing process search system 400 is comprised of a manufacturing process search component 402 that receives a search query 404 and provides query results 406. The manufacturing process search component 402 is comprised of a manufacturing process search engine 408, data brokers "1-N" 410-414, where "N" is an integer from one to infinity, and a manufacturing process indexing component 416. The manufacturing process indexing component 416 is comprised of indexing agents "1-P" 418-422, where "P" is an integer from one to infinity.

The manufacturing process search engine 408 receives the search query 404 and provides a search query language interpreter (e.g., a natural search query language interpreter) to facilitate in processing the search query 404. Depending on the search query 404 itself, the manufacturing process search engine 408 can employ the sets of data brokers "1-N" 410-412 and/or the indexing agents "1-P" 418-422 to facilitate a search. In this example, the data brokers "1-N" 410-414 access respective real-time and/or historical data 424 as necessary to respond to a search request from the manufacturing process search engine 408. In this instance, the indexing agents "1-P" 418-422 are employed directly (i.e., an overall index is not utilized in this example) to facilitate in searching respective configuration data 426 to facilitate a search request from the manufacturing process search engine 408. The manufacturing process search engine 408 combines returned search results into an aggregate list of objects and provides them as query results 406. One skilled in the art can appreciate that other instances can include a manufacturing process indexing component 416 that utilizes an overall index and responds to search requests from the manufacturing process search engine 408 by employing the overall index and/or by employing sub-indices supplied by the indexing agents "1-P" 418-422.

Figure 5:
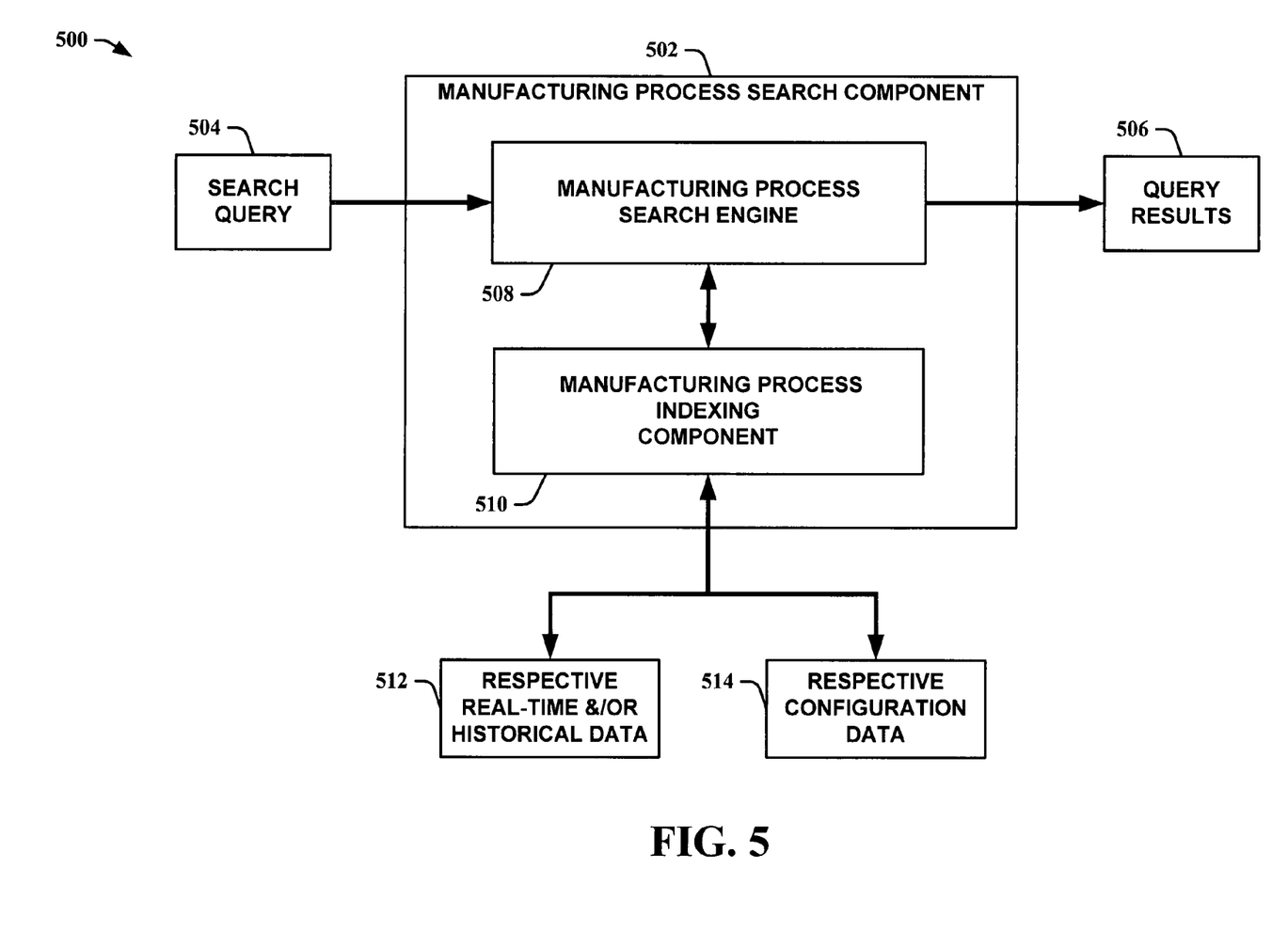
FIG. 5 is another block diagram of a manufacturing process search system in accordance with an aspect of an embodiment.

Referring to FIG. 5, another block diagram of a manufacturing process search system 500 in accordance with an aspect of an embodiment is depicted. The manufacturing process search system 500 is comprised of a manufacturing process search component 502 that receives a search query 504 and provides query results 506. The manufacturing process search component 502 is comprised of a manufacturing process search engine 508 and a manufacturing process indexing component 510. In this example, the manufacturing process search component 502 does not employ separate data brokers to facilitate in a search request from the manufacturing process search engine 508. The manufacturing process indexing component 510 searches and indexes respective real-time and/or historical data 512 and/or respective configuration data 514. To accomplish this, the manufacturing process indexing component 510 can include a set of data brokers and/or provide an interface to interact with existing data brokers (not illustrated). In other instances, the manufacturing process indexing component 510 can also employ specialized indexing agents that directly interact with manufacturing processes to dynamically index real-time data and/or index stored process related data to facilitate in search requests.

The supra systems provide a means to facilitate searching the enormous amounts of data produced by manufacturing control and monitoring systems. While running, control systems produce both real-time and historical data about the status of a given process—including alarms, process values, and audit/error logs. Configuration data is also produced such as controller code, alarm, HMI, recipe and report definitions and the like. Sorting through all of this data is exacerbated by the fact that the data is disparate, unrelated, and not searchable. For example, attempting to look for "all the alarms in a system" or all objects that contain the string "Tag1" in them would result in nothing or at best a small subset obtained by data perusal.

Thus, the systems and methods herein support instances that facilitate in searching manufacturing process information quickly and efficiently. For example, a system composed of a search engine, data brokers, indexing agents and a query language is provided that enables users to search their production control system for configuration, real-time and historical information based on user specified search criteria by returning information that matches the criteria from data brokers and/or indexing agents. Queries can return textual and/or graphical (e.g., HMI) results and the like.

This allows, for example, a user to enter a search string in their natural language into a "search for" field. This query string is sent to a manufacturing process search engine which in turn sends it to all of its known data brokers and/or indexing agents. These subcomponents search their respective files, indexes, and/or namespaces for instances of objects that match the user's specified search string. Any objects found are returned to the search engine in a results list. The search engine, in turn, combines the result lists into an aggregate list of objects and returns it to the requesting user in the form of a list of selectable objects with type information (text, graphics or "object"). The user then selects which objects they would like to view, and the system renders it in a format consistent with the object's type. Separate data brokers can be available for searching/indexing real-time process variables (tags) and/or historical data persisted in databases. Separate indexing agents can be available for indexing the contents of each configuration component in an HMI system. For example, one for indexing HMI projects, controller code, recipe definitions and/or report definitions and the like.

Figure 6:
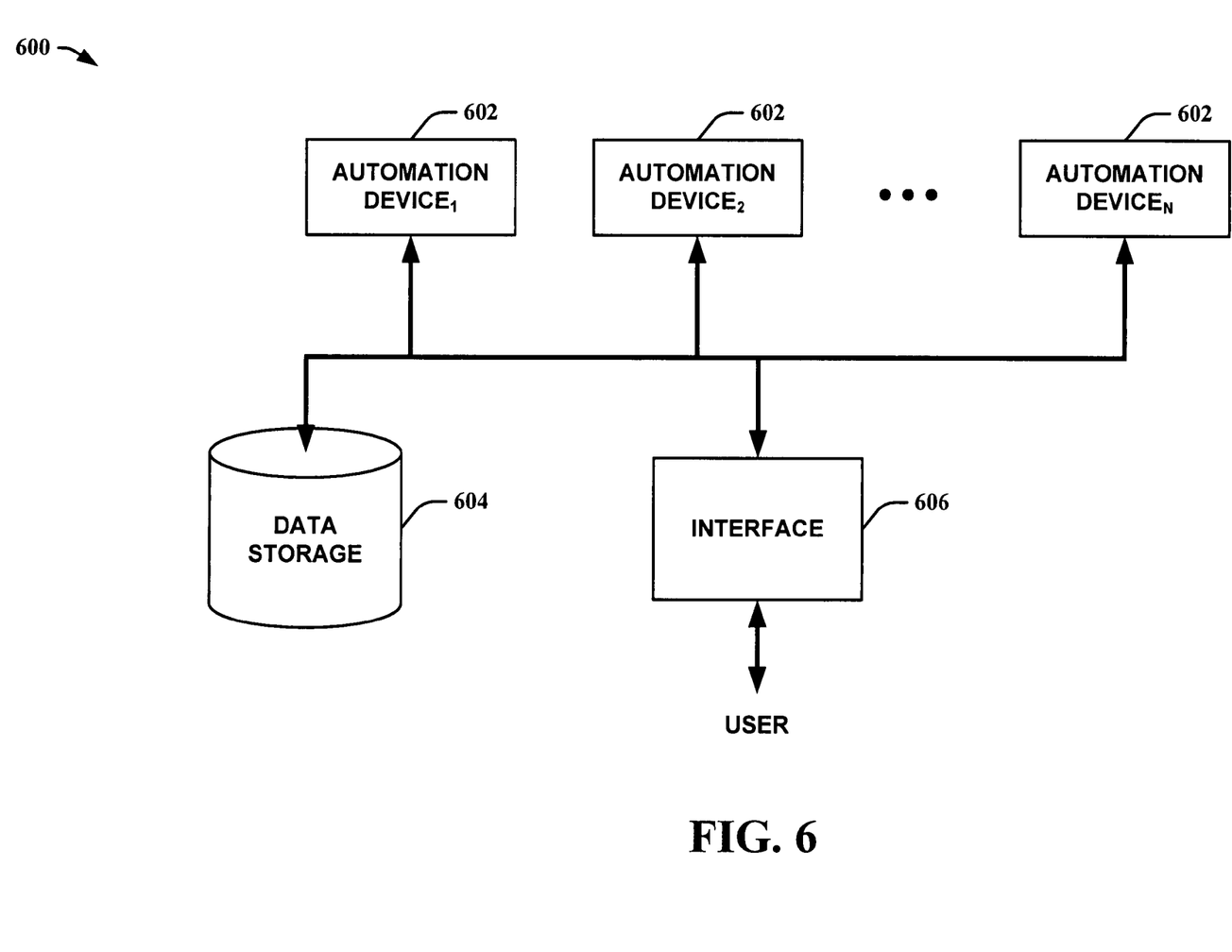
FIG. 6 is a block diagram of an industrial automation system in accordance with an aspect of an embodiment.

Looking at FIG. 6, a block diagram of a typical industrial automation system 600 in which the systems and methods herein can be employed with is shown. The industrial automation system 600 is comprised of one or more automation device(s) 602 (AUTOMATION DEVICE$_1$, through AUTOMATION DEVICE$_N$, where N is an integer from one to infinity), data storage 604 and interface 606. Automation device(s) 602 can include any one of a plurality of industrial processes and machines such as programmable logic controllers (PLCs), pumps providing fluid transport and other processes, fans, conveyor systems, compressors, gear boxes, motion control and detection devices, sensors, screw pumps, and mixers, as well as hydraulic and pneumatic machines driven by motors. Such motors can be combined with other components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system.

Data storage 604 provides a storage location for housing data relating to automation device(s) 602 including but not limited to device description, location, and mechanical condition, energy or fuel consumption, completed cycles, horsepower, average RPM, efficiency rating, as well as data from sensors regarding device health and/or performance. The data storage 604 can be integrated or federated and linked by a communication system. Interface 606 is operable to connect users with a network of automation devices 602 and/or data storage 604 via a wire (e.g., twisted pair, coaxial cable, optical fiber, Ethernet, USB (Universal Serial Bus), FireWire) or wirelessly (e.g., using IEEE 802.11a and/or IEEE 802.11b standards, Bluetooth technology, satellite). Interface 606 facilitates monitoring, extracting, transmitting, and otherwise interacting with automated device(s) 602 and associated data.

As shown in FIG. 6, a user such as, for example, a device operator can connect to data storage 604 and automation devices 602 over a local area network (LAN) utilizing a variety of LAN technologies, including Fiber Distributed Data Interface (FDDI), Copper Distributed Data Interface (CDDI), Ethernet/IEEE 802.3, Token Ring/IEEE 802.5, physical connection topologies such as bus, tree, ring, and star, and the like. However, communications between networked devices such as automation devices 602, data storage 604, and interface 606 need not be limited to those devices connected locally to a network. Local networked devices can also communicate to and from remote devices.

Figure 7:
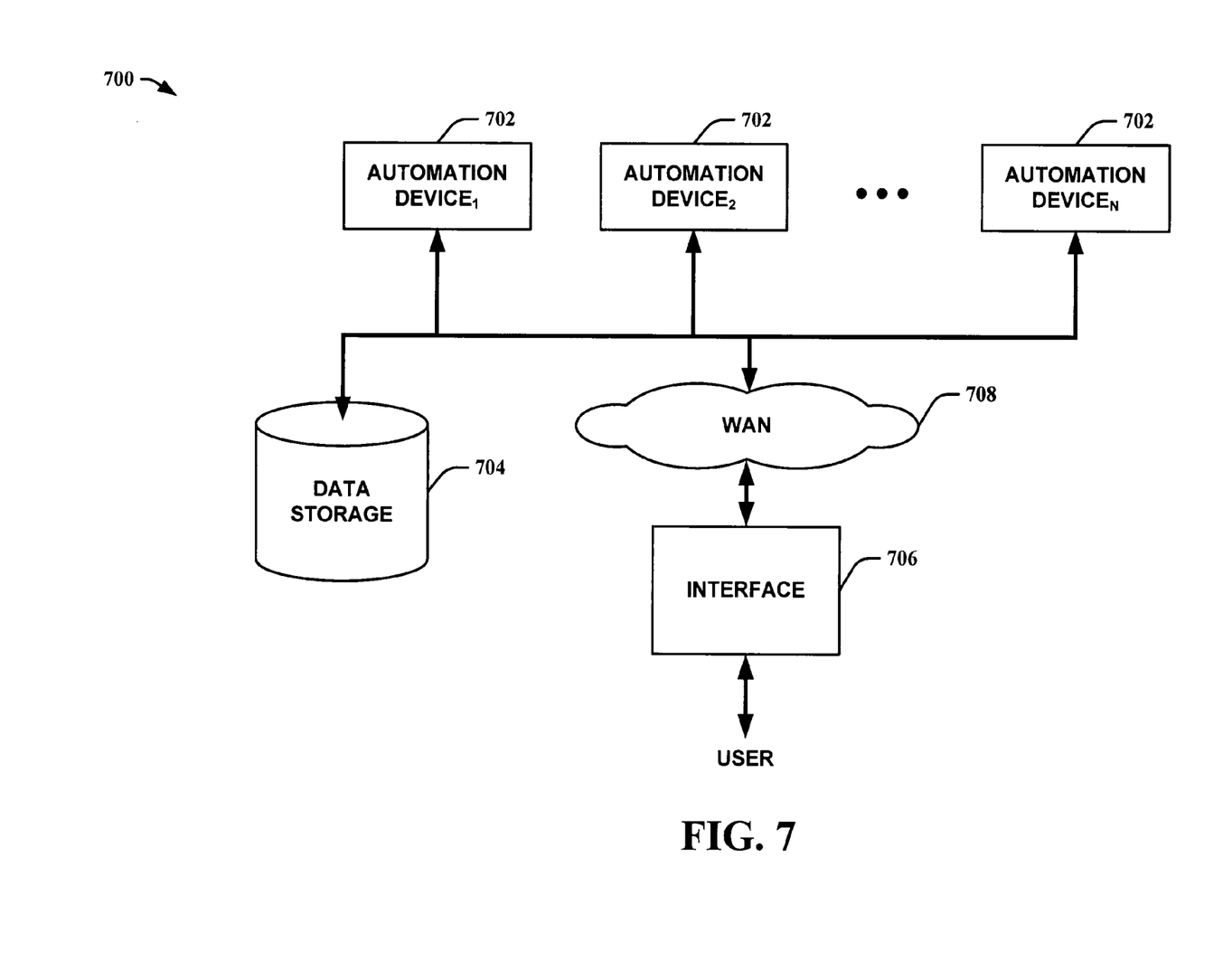
FIG. 7 is another block diagram of an industrial automation system in accordance with an aspect of an embodiment

Turning to FIG. 7, another block diagram of an industrial automation system 700 in which the systems and methods herein can be employed with is depicted. FIG. 7 is substantially the same as system 600 except that a user employs interface 706 to interact with automation devices 702 and data storage 704 remotely over a wide area network (WAN) 708. WANs 708 are communication networks that span a large geographic area (e.g., nationwide, worldwide) and generally consist of the several interconnected local area networks (LANs) and metropolitan area networks (MANs). The largest WAN 708 in existence today is the Internet. WAN technologies include, but are not limited to, point-to-point links, circuit switching networks like Integrated Services Digital Networks (ISDN) and variations thereof, packet switching networks, T1 networks, and Digital Subscriber Lines (DSL).

Figure 8:
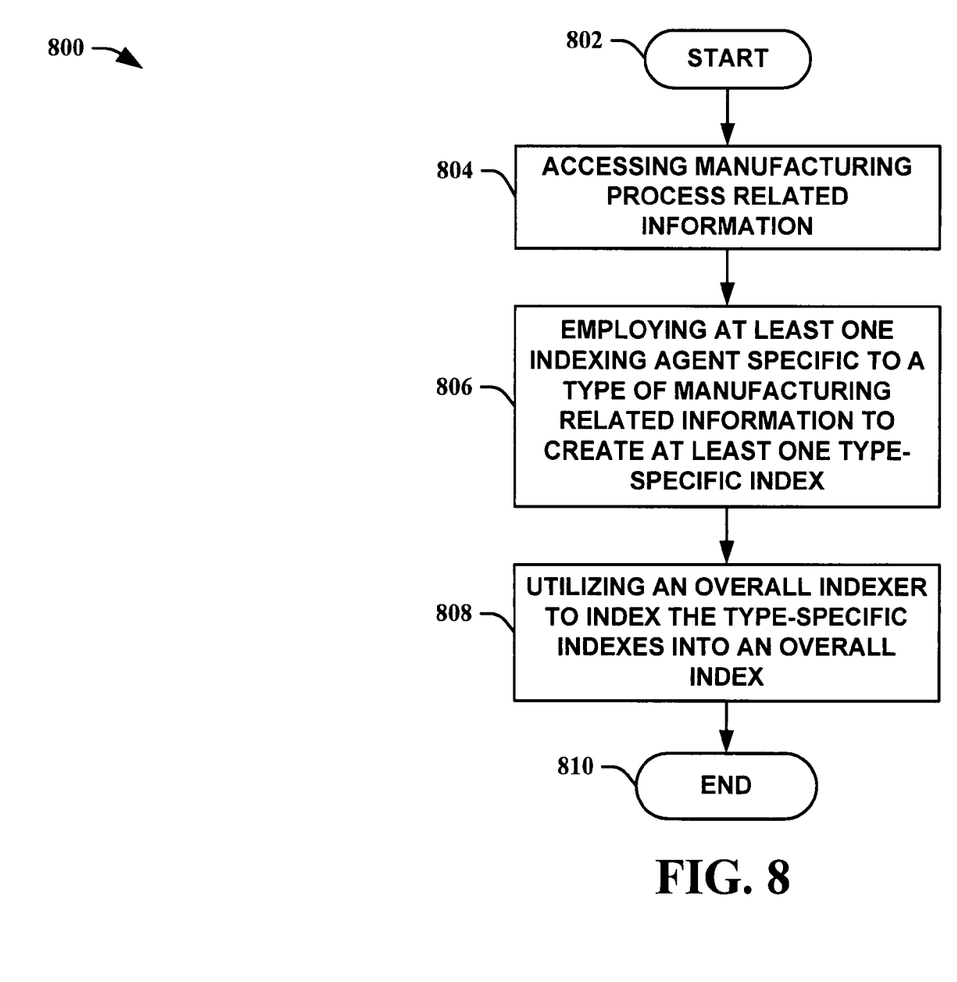
FIG. 8 is a flow diagram of a method of facilitating manufacturing process information searching in accordance with an aspect of an embodiment.
Figure 9:
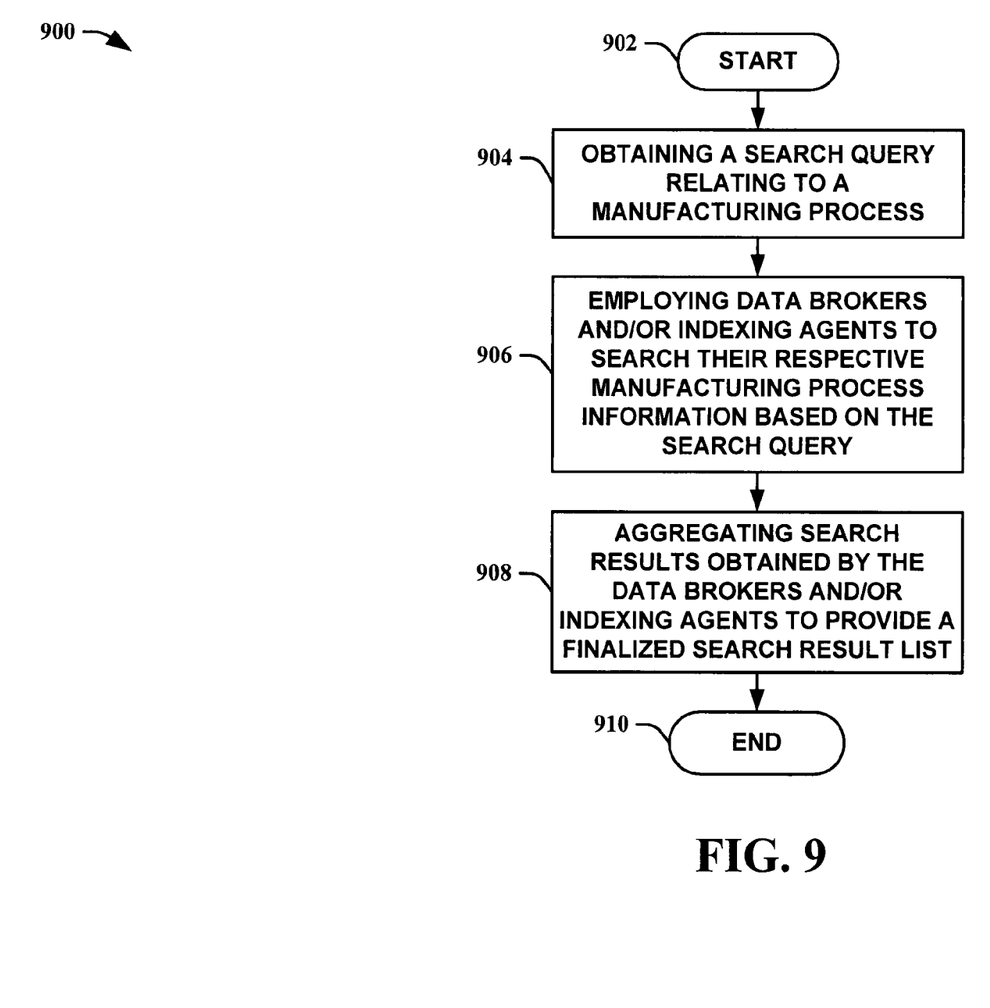
FIG. 9 is another flow diagram of a method of facilitating manufacturing process information searching in accordance with an aspect of an embodiment.
Figure 10:
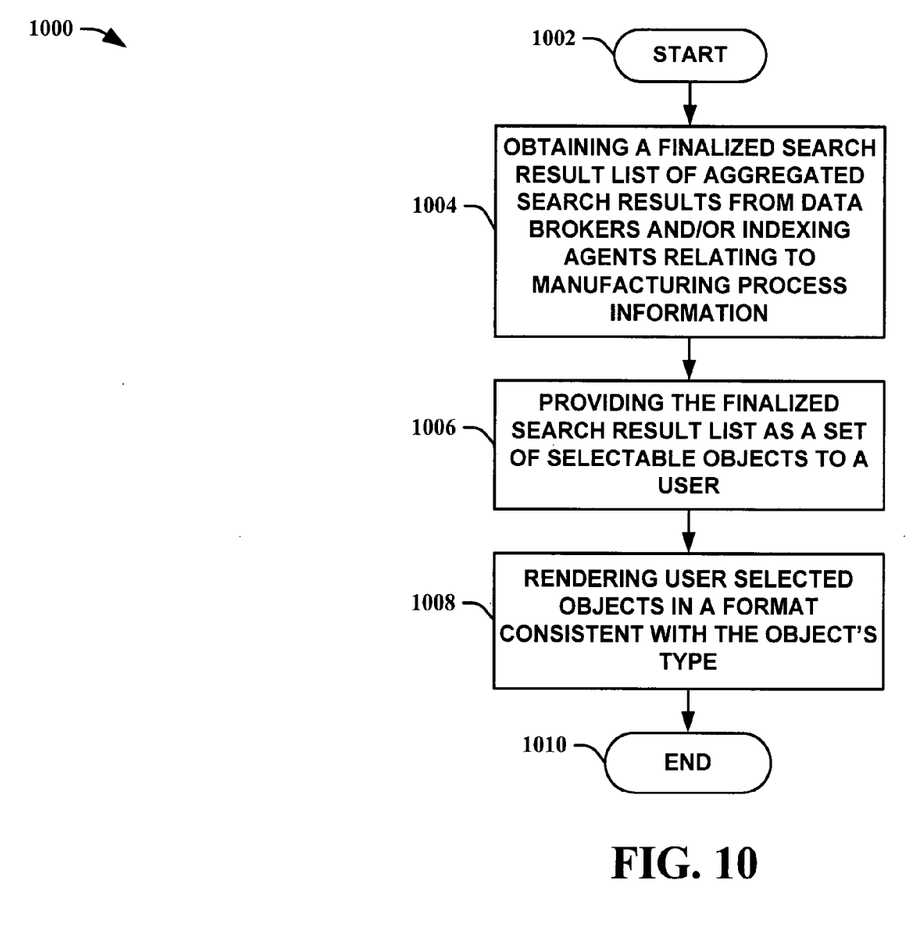
FIG. 10 is a flow diagram of a method of providing manufacturing process information search results in accordance with an aspect of an embodiment.

In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

In FIG. 8, a flow diagram of a method 800 of facilitating manufacturing process information searching in accordance with an aspect of an embodiment is shown. The method 800 starts 802 by accessing manufacturing process related information 804. The manufacturing process related information can include, but is not limited to, real-time data and/or historical data relating to a manufacturing process. For example, real-time process variables (tags), historical data stored in persistent storage, and/or HMI system configuration component data (e.g., HMI project data, controller code, recipe definitions, and/or report definitions, etc.). At least one indexing agent specific to a type of manufacturing related information is then employed to create at least one type-specific index 806 (i.e., "sub-index). This allows disparate data types to be efficiently indexed to facilitate in searching the data. An overall indexer is utilized to index the type-specific indexes into an overall index 808, ending the flow 810. One skilled in the art can appreciate that other instances can include elimination of the overall index and utilization of the type-specific index itself to facilitate in searching the disparate data.

Looking at FIG. 9, another flow diagram of a method 900 of facilitating manufacturing process information searching in accordance with an aspect of an embodiment is illustrated. The method 900 starts 902 by obtaining a search query relating to a manufacturing process 904. The search query can include, for example, a natural language search query and/or search queries that are processed in light of the user's manufacturing environment. Data brokers and/or indexing agents are employed to search their respective manufacturing process information based on the search query 906. Because the data in a manufacturing process environment is disparate, each type of data can require a separate data broker and/or indexing agent. Search results obtained by the data brokers and/or indexing agents are then aggregated to provide a finalized search result list 908, ending the flow 910. This allows a user to quickly find data relevant to their request without perusing volumes of data in a database or monitoring real-time data streams. It also allows associated information to be discovered that might not be found utilizing traditional methods.

Turning to FIG. 10, a flow diagram of a method 1000 of providing manufacturing process information search results in accordance with an aspect of an embodiment is depicted. The method 1000 starts 1002 by obtaining a finalized search result list of aggregated search results from data brokers and/or indexing agents relating to manufacturing process information 1004. The aggregated search result list is typically generated in response to a search query formulated by a user in a manufacturing environment. The finalized search result list is provided as a set of selectable objects to a user 1006. The selectable objects can include, for example, text objects and/or graphical objects and the like. Thus, a user can be presented with display formats and/or data and the like that can be selected via, for example, a monitor. User selected objects are then rendered in a format consistent with the object's type 1008, ending the flow 1010. For example, if a data chart is presented to the user as a selectable item, a data chart is generated and, for example, displayed to the user. If an HMI display is selected, the display is generated and shown to the user.

Figure 11:
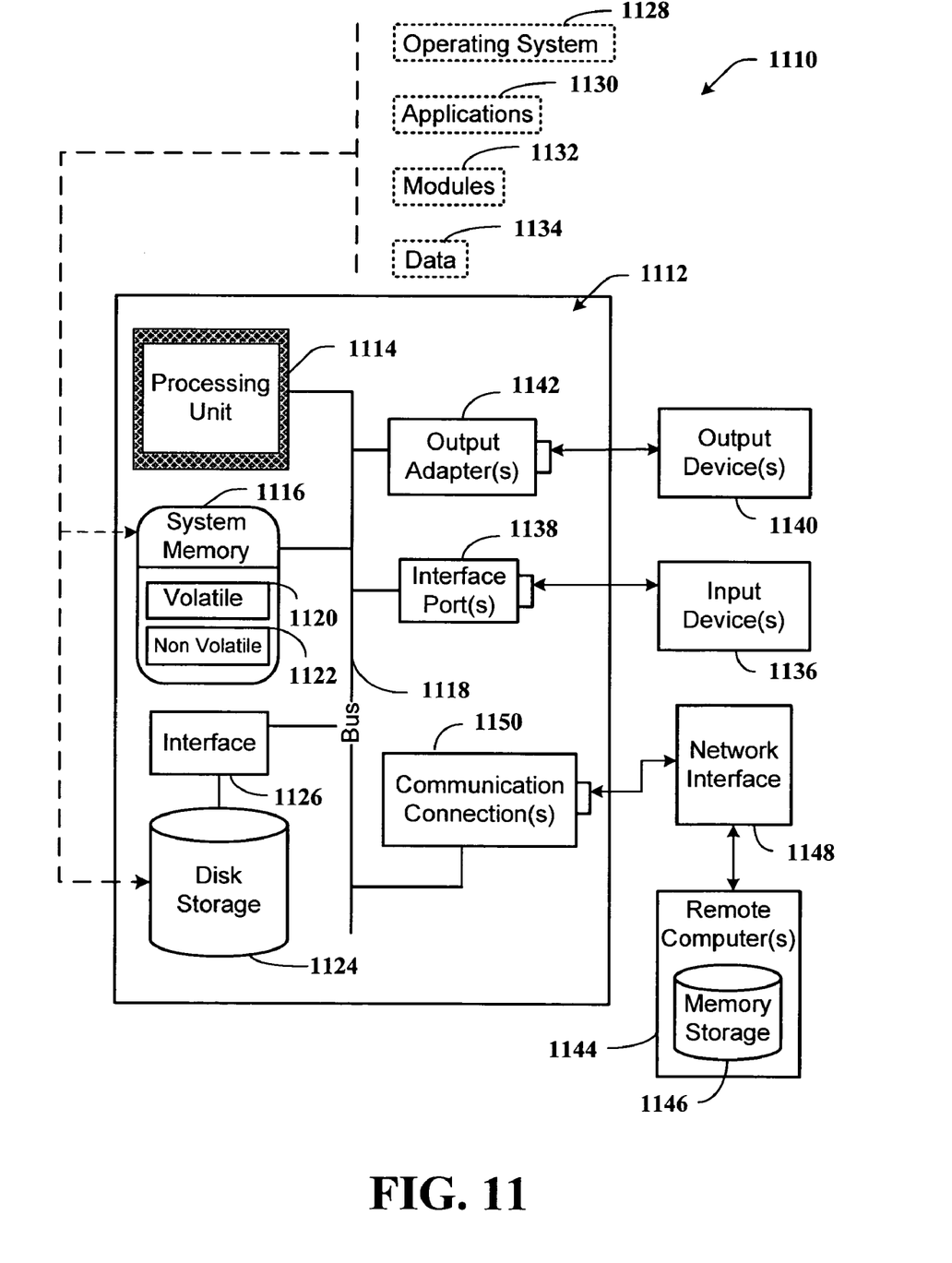
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments can be implemented. While the embodiments have been described above in the general context of computer-executable instructions of a computer program that runs on a local computer and/or remote computer, those skilled in the art will recognize that the embodiments can also be implemented in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, handheld computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can include one or more subcomponents.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s)

1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
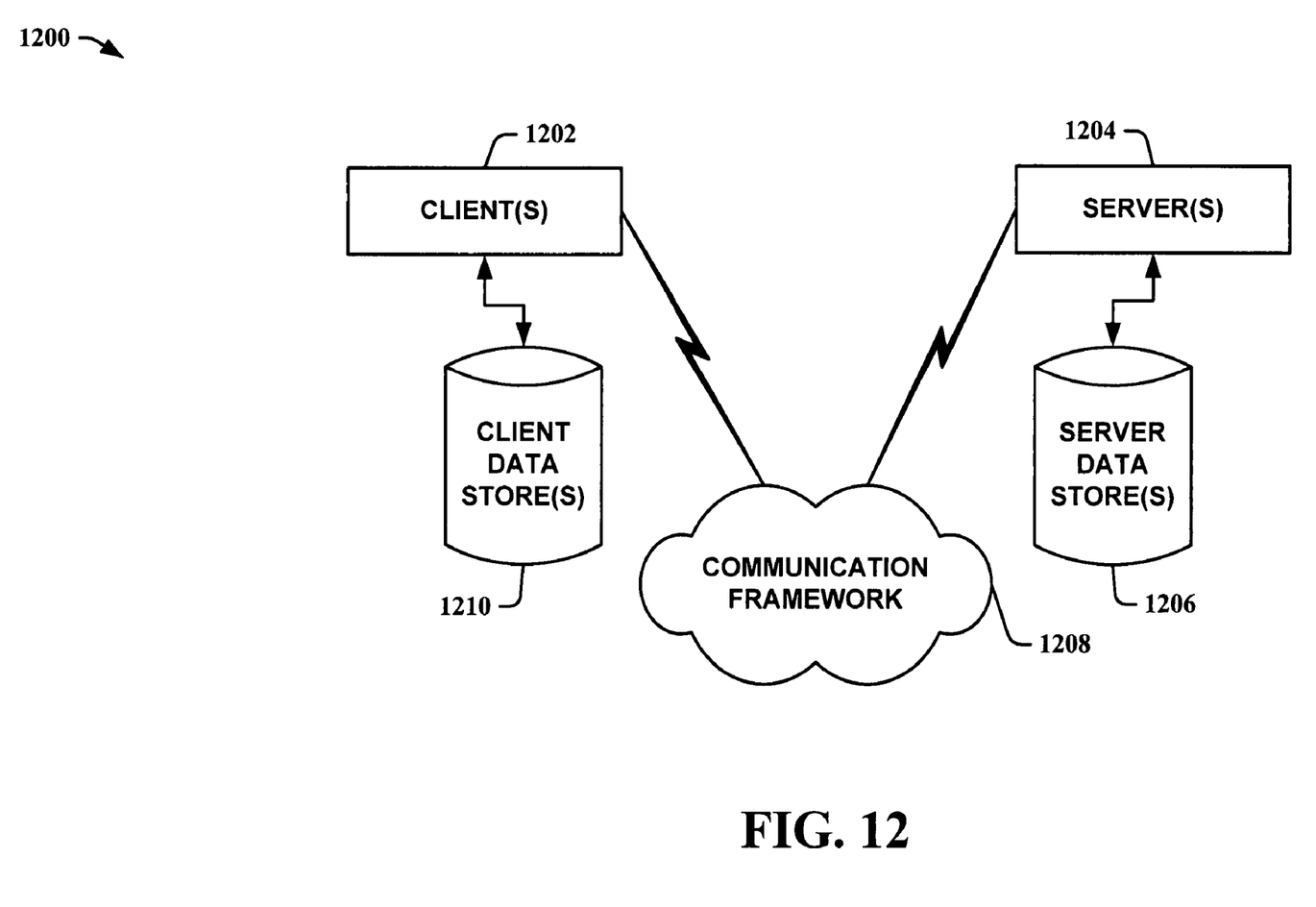
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 can be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

In one instance of an embodiment, a data packet transmitted between two or more computer components that facilitates manufacturing process information searching is comprised of, at least in part, information relating to a manufacturing process indexing system that utilizes, at least in part, an indexing agent to create at least one sub-index for a manufacturing process information type.

It is to be appreciated that the systems and/or methods of the embodiments can be utilized in manufacturing process information search facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates searching manufacturing process information, comprising:
   a memory that stores computer-executable components;
   a processor, communicatively coupled to the memory, that facilitates execution of the computer-executable components, the computer-executable components including:
   a plurality of indexing agents, specific to a plurality of disparate types of manufacturing information, that are configured to access the plurality of disparate types of manufacturing information from a manufacturing process within an industrial automation system and configured to create searchable sub-indices for the plurality of disparate types of manufacturing information, wherein a number of the plurality of indexing agents employed is at least one of expanded or reduced based in part on a change in a number of the plurality of disparate types of manufacturing information; and
   a manufacturing process search engine configured to employ the at least a portion of the searchable sub-indices to facilitate in responding to a manufacturing process information search query, wherein the manufacturing process search engine includes at least one data broker configured to access at least one of real-time data from an industrial automation device or historical data associated with a data storage.

2. The system of claim 1, the computer-executable components further comprising:
   a master indexing component configured to derive an overall index via aggregation of the at least the portion of the searchable sub-indices.

3. The system of claim 2, wherein the manufacturing process search engine is further configured to employ the overall index to facilitate in responding to a manufacturing process information search query.

4. The system of claim 1, the computer-executable components further comprising:
   a manufacturing process indexing component configured to provide at least one index based on at least a portion of the searchable sub-indices.

5. The system of claim 1, wherein the manufacturing process search engine is further configured to process a natural language search query for manufacturing process information.

6. The system of claim 1, wherein the at least one data broker is further configured to search within at least one a set of files, a set of indexes, or a set of namespaces for an instance of an object based in part on the manufacturing process information search query.

7. The system of claim 1, wherein the manufacturing process search engine is further configured to aggregate search results from the at least one data broker and at least one of the plurality of indexing agents to provide at least one search result object to a user.

8. The system of claim 7, wherein the search result object comprises a user selectable search result object.

9. The system of claim 7, wherein the search result object comprises at least one of a text object or a graphical object.

10. The system of claim 1, wherein the plurality of disparate types of manufacturing information comprises at least one of process configuration data, a real-time process variable, or historical process data.

11. The system of claim 10, wherein the process configuration data comprises at least one of a human machine interface (HMI) project, controller code, a recipe definition, or a report definition.

12. The system of claim 1, wherein the data brokers utilize at least one of the plurality of indexing agents to facilitate searching process configuration data.

13. The system of claim 1, wherein at least one of the plurality of indexing agents operates in real-time to index real-time manufacturing process data in response to reception of a search query.

14. A method for facilitating searching manufacturing process information, comprising:
   mapping at least one first indexing agent to a first type of information accessed from a manufacturing process within an industrial automation system;
   mapping at least one second indexing agent to a second type of information accessed from the manufacturing process;
   creating one or more type-specific indices by employing the at least one first indexing agent and the at least one second indexing agent;
   changing a number of indexing agents employed in the industrial automation system in response to a change in a number of types of information accessed from the manufacturing process; and
   employing at least one of the one or more type-specific indices, real-time data accessed from an industrial automation device via a first data broker, or historical data accessed from a data storage via a second data broker to facilitate responding to a manufacturing process information search query.

15. The method of claim 14, further comprising:
   deriving at least one overall searchable index based on aggregation of the one or more type-specific indices.

16. The method of claim 15, further comprising:
   employing the at least one overall searchable index to facilitate responding to the manufacturing process information search query.

17. The method of claim 14, wherein the responding includes responding to a natural language search query relating to manufacturing process information.

18. The method of claim 14, further comprising:
   accessing the real-time data from the industrial automation device via the first data broker; and
   accessing the historical data associated with the data storage via the second data broker.

19. The method of claim 18, further comprising:
   aggregating search results from at least one of the first data broker, the second data broker, at least one first indexing agent, or the at least one second indexing agent; and
   generating at least one search result object based on the aggregating.

20. The method of claim 19, wherein the generating includes generating at least one user selectable search result object.

21. The method of claim 19, wherein the generating includes generating at least one of a text object or a graphical object.

22. The method of claim 14, further comprising:
   accessing at least one of the first type of information or the second type of information from the manufacturing process, including accessing at least one of process configuration data, a real-time process variable, or historical process data.

23. The method of claim 22, further comprising:
   accessing at least one of the first type of information or the second type of information from the manufacturing process, including accessing at least one of a human machine interface project data, controller code, a recipe definition, or a report definition.

24. The method of claim 14, further comprising, searching at least one of a file, an index, or a namespace for an instance of an object that matches a received search string associated with the manufacturing process information search query.

25. The method of claim 14, wherein the creating includes indexing real-time manufacturing process data by employing at least one of the at least one first indexing agent or the at least one second indexing agent operating in real-time.

26. A non-transitory computer-readable storage medium comprising computer-executable instructions that, in response to execution, cause an industrial automation system, including at least one processor, to perform operations, comprising:
   accessing a first and a second type of information from a manufacturing process within an industrial automation system;
   creating a first set of sub-indices by employing a first set of indexing agents that are mapped to the first type of information;
   creating a second set of sub-indices by employing a second set of indexing agents that are mapped to the second type of information;
   modifying a number of sets of indexing agents in response to at least one of an increase or decrease in a number of types of manufacturing information received from the manufacturing process; and
   employing at least one of the first set of sub-indices, the second set of sub-indices, real-time data accessed from an industrial automation device via a first data broker, or historical data accessed from a data storage via a second data broker to facilitate responding to a manufacturing process information search query.

27. The system of claim 1, wherein the plurality of indexing agents are remotely coupled to the manufacturing process indexing component.

28. The non-transitory computer readable storage medium of claim 26, wherein the operations further comprise:
   identifying at least one of a file, an index, or a namespace for an instance of an object that matches a received search string associated with the manufacturing process information search query.

29. The non-transitory computer readable storage medium of claim 26, wherein the operations further comprise:
   determining at least one overall index based on at least one of the first set of sub-indices or the second set of sub-indices.

* * * * *